United States Patent
Hartfiel et al.

(10) Patent No.: US 11,270,484 B2
(45) Date of Patent: Mar. 8, 2022

(54) SYSTEM AND METHOD FOR SEMANTIC SEGMENTATION OF A SOURCE GEOMETRY

(71) Applicant: MappedIn Inc., Waterloo (CA)

(72) Inventors: Adam Hartfiel, Kitchener (CA); Erkang Wei, Waterloo (CA)

(73) Assignee: MappedIn Inc., Waterloo (CA)

( * ) Notice: Subject to any disclaimer, the term of this patent is extended or adjusted under 35 U.S.C. 154(b) by 0 days.

(21) Appl. No.: 16/987,914

(22) Filed: Aug. 7, 2020

(65) Prior Publication Data

US 2021/0065417 A1    Mar. 4, 2021

Related U.S. Application Data

(60) Provisional application No. 62/895,136, filed on Sep. 3, 2019.

(51) Int. Cl.
| | |
|---|---|
| *G06T 11/40* | (2006.01) |
| *G06N 3/08* | (2006.01) |
| *G06T 11/20* | (2006.01) |
| *G06T 11/60* | (2006.01) |

(52) U.S. Cl.
CPC .............. *G06T 11/40* (2013.01); *G06N 3/08* (2013.01); *G06T 11/203* (2013.01); *G06T 11/60* (2013.01)

(58) Field of Classification Search
CPC ....................................................... G06T 11/40
See application file for complete search history.

(56) References Cited

U.S. PATENT DOCUMENTS

| | | | |
|---|---|---|---|
| 5,631,982 A | 5/1997 | Inselberg et al. | |
| 11,074,495 B2 | 7/2021 | Zadeh et al. | |
| 2005/0228586 A1 | 10/2005 | Yuasa et al. | |
| 2009/0216438 A1* | 8/2009 | Shafer ................... | G01C 21/20 701/414 |
| 2013/0222385 A1 | 8/2013 | Dorsey et al. | |
| 2014/0035948 A1* | 2/2014 | Maurer .................. | G06T 17/05 345/619 |
| 2015/0128090 A1* | 5/2015 | Maurer ............... | G06F 3/04847 715/800 |

OTHER PUBLICATIONS

Efford, "Morphological Image Processing", Apr. 17, 2019.

* cited by examiner

*Primary Examiner* — Shivang I Patel
(74) *Attorney, Agent, or Firm* — Own Innovation; James W. Hinton

(57) ABSTRACT

Systems and methods for semantic segmentation of a source geometry are provided. The method includes providing a vector image of a location; generating a raster image from the vector image, the raster image including at least one partition, the at least one partition including a plurality of pixels; assigning a pixel class label to each of the plurality of pixels, the pixel class label including a usage type; and assigning a partition class label to the at least one partition based on the pixel class labels assigned to the plurality of pixels, wherein the partition class label includes a usage type for the partition.

20 Claims, 13 Drawing Sheets

SYSTEM AND METHOD FOR SEMANTIC SEGMENTATION OF A SOURCE GEOMETRY

TECHNICAL FIELD

The following relates generally to image segmentation, and more particularly to segmenting cartographic source images by semantic inference.

INTRODUCTION

Electronic maps are becoming increasingly useful and used for both interior and exterior site navigation. As most mapped locations have a plurality of different areas with a variety of different usages, correctly labeling these different usage areas on a map can be important in the creation and eventual use of an electronic map.

Using existing approaches, the task of identifying the different usage areas and creating a visually appealing and correctly labelled representation is often performed by a human. This process can be inefficient, time-consuming, and expensive. Systems and methods which may streamline this process are therefore desirable.

Accordingly, there is a need for systems and methods which automatically perform the task of creating detailed and informative electronic maps quickly and efficiently with minimal human involvement.

SUMMARY

In accordance with one aspect, the present application describes a method of performing semantic inference on an image of a location. The method includes providing a vector image of a location; generating a raster image from the vector image, the raster image including at least one partition, the at least one partition including a plurality of pixels; assigning a pixel class label to each of the plurality of pixels, the pixel class label including a usage type; and assigning a partition class label to the at least one partition based on the pixel class labels assigned to the plurality of pixels, wherein the partition class label includes a usage type for the partition.

The method may further include generating a labelled image of the location wherein the at least one partition includes a partition identifier based on the partition class label, and wherein the partition identifier is specific to the usage type associated with the partition class label.

Providing the vector image may further include generating the vector image from a non-vector source image.

The method may further include detecting text content in the vector image and removing the text content from the vector image.

Assigning a partition label to the at least one partition may further include determining the most commonly assigned pixel class label and assigning the most commonly assigned pixel class label as the partition class label.

Generating a raster image may further include generating a raster image having a resolution that is lower than the resolution of the vector image, and wherein the resolution of the raster image is within an acceptable range for performing the assigning pixel class labels to the plurality of pixels.

The method may further include generating aligned data by validating the pixel class labels using the pixel class labels and the vector image; and training a neural network using the aligned data, wherein the neural network is configured to perform the assigning the pixel class labels.

The method may further include generating the vector image from a raster source image, and wherein the raster source image has a resolution higher than the raster image.

The method may further include identifying the at least one partition by tracing a polygon onto the vector image, wherein the polygon corresponds to the at least one partition and assigning the partition class label to the polygon.

The raster image may be a monochromatic line image.

In accordance with another aspect, the present application describes a system for performing semantic inference on an image of a location The system may include: a processor for preforming any one or more of the methods of claims 1 to 10; and a memory for storing the data of any one or more of the methods of claims 1 to 10.

In accordance with other aspects, the present application describes systems, methods, and devices as generally and as specifically described herein.

In accordance with one aspect, the present application describes a method of performing semantic inference on an image of a location. The method may include: providing a raster image of a location; assigning the raster image at least one partition, the at least one partition including a plurality of pixels; assigning a pixel class label to each of the plurality of pixels, the pixel class label including a usage type; and assigning a partition class label to the at least one partition based on the pixel class labels assigned to the plurality of pixels, wherein the partition class label includes a usage type for the partition.

The method may further include generating a fixed-resolution raster image from the raster image wherein the fixed-resolution raster image has a lower resolution than a resolution of the raster image. Generating a fixed-resolution raster image from the raster image may include: generating a vector image from the raster image; and generating a fixed-resolution raster image from the vector image.

The method may further include generating a labelled image of the location wherein the at least one partition includes a partition identifier based on the partition class label, and wherein the partition identifier is specific to the usage type associated with the partition class label.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
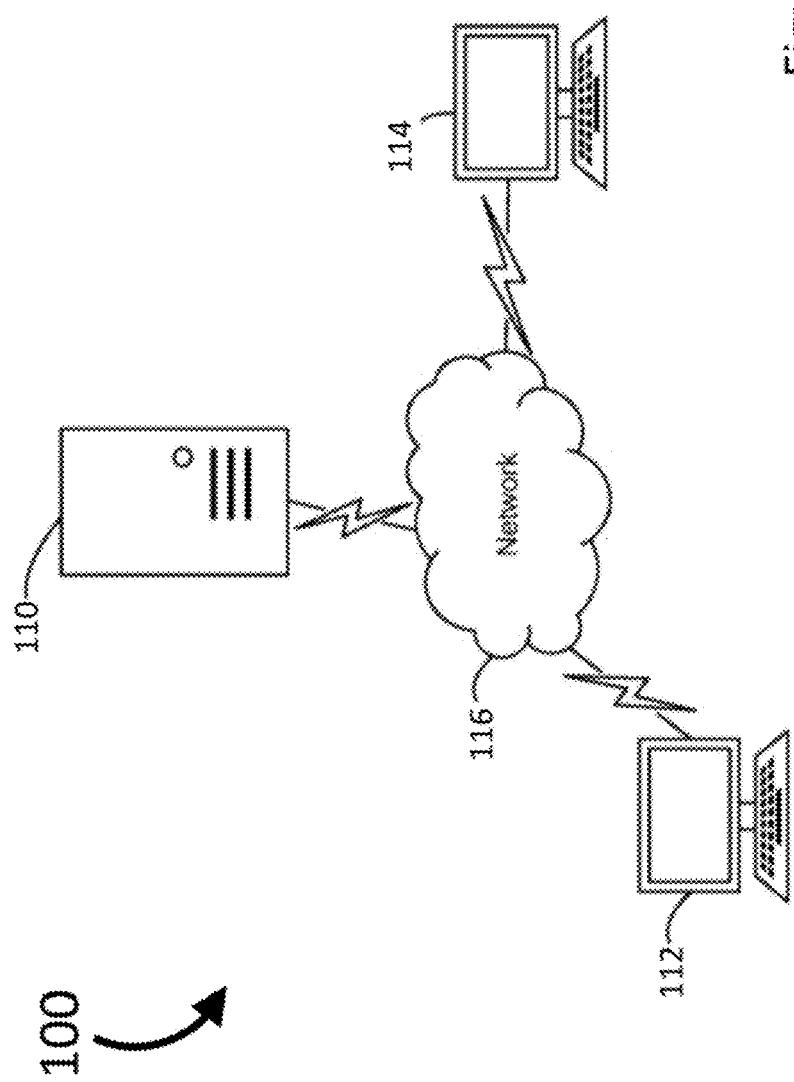
FIG. 1 is a schematic diagram of a system for semantic segmentation of a source geometry, in accordance with at least one embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to semantic segmentation of an image, and more particularly to creating labelled cartographic representations of a location using artificial intelligence.

The systems and methods herein describe an automatic cartographic semantic inference process wherein a source image of a location is ingested by a system which uses an artificial intelligence network to classify the source image by region and then create a stylized and labelled representation of the location. The representation generated by the system may be used for wayfinding.

The system may partition maps or images of a location, determine the usage of each partition, and label each partition according to the determined usage. The system may also add appropriate artistic detail to each partition to create a final map.

The system may also be used to assemble collections of images of a single location into a single representation of the location. For example, the system may assemble floor plans for each floor of a multi-floor building into a single representation of the entire multi-floor venue.

In an embodiment, the system uses human labelled map usage data and raw source maps to train a neural network or other artificial intelligence network (e.g. a machine learning classifier) to infer a per pixel usage for a given line art map. The pixel classification can be mapped back onto the source image to automatically determine the usage of regions (stores, parking, etc.) in a visual map or site plan.

The system may also include an offline feedback system. The offline feedback system allows a human user to interact with the system and review the results of the neural network inference, correct any mistakes (e.g. mislabeled or misclassified area/partition), and submit the corrected usage and source image. The corrected usage and source image can be stored by the system as further training data for training the neural network. The neural network may be trained, retrained, or updated using the further training data.

The system may be used in various application domains, such as cartography. The system may be used in the digitization of malls, hospitals, schools, and similar sized facilities for the purposes of building navigable representations of the interior/exterior of the facilities. The system may be used for retail and warehouse spatial understanding to determine the location of objects. The system may be used for emergency services and pre-incident planning. The system may have domain applications in non-mapping domains, for example in the "mapping" of items with planar geometries, such as circuit boards and technical diagrams.

Referring now to FIG. 1, shown therein is a block diagram illustrating one example embodiment of a system 100 for performing cartographic semantic segmentation on a source image, in accordance with some embodiments.

The system 100 can be used to generate a labelled geometry for a facility or location. The term facility as used herein means not only a primary structure of the facility (i.e.

building or buildings), but also the surrounding area (e.g. parking lots, sidewalks, green spaces, or the like). The system 100 is not restricted to a single facility and may be extended to multiple facilities of the same type and/or different types. The facility may include multiple objects. Examples of objects that may be included in a given facility can include facility units, obstructions, connections, regions and the like. For the purposes of this description, facility units may be configured as stores, rooms and other types of identifiable, generally bounded structures that may form a part of a larger facility.

For example, facility units may include stores within a shopping center, offices within a commercial office building, classrooms within a school, patient rooms within a hospital, bathrooms inside other structures and the like. Obstructions may include objects that are generally not traversable by facility users or visitors and that may tend to impede navigation throughout the facility. Examples of obstructions can include tables, benches, shelves, beds, other furniture, fountains, sculptures and other objects that are placed within a facility or facility unit but typically do not form part of the structure of the facility or facility unit. Connections may be portions of a facility or facility unit that extend between, and connect, two or more traversable areas of the facility. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like.

The system 100 may allow a user to use artificial intelligence to create a labelled image of the specified location quickly and efficiently. In an embodiment, the user is a map creator. The map creator may be an individual who works for a map creation company and/or who is experienced in electronic map design. In another embodiment, the user is a non-map creator (or "non-creator") such as a facility operator, facility owner, or other individual not experienced or trained in map creation and design (i.e. not a map creator). In some cases, the non-creator may be a client or customer of the map creator. In other cases a user may not include a map creator from a map creation business or their client and may be any user who wishes to create a map or cartographic representation of a location or other source The user (e.g. map creator) may be able to use the system 100 to digitize real images of a location (e.g. shopping center, hospital, school, etc.) to create a map. The map may include interior representations, exterior representations, or both interior and exterior representations. The representations can be used for the purposes of navigation without requiring a human agent such as a map creator to draw and label all the aspects of the map themselves. This may make the process more efficient and less expensive.

The facility may be any type of facility and may include a single building or two or more separate buildings, each of which may include any suitable facility units and other objects. The representations of the facility may also include surrounding points of interest, e.g. parking lots, transit locations, parking structures, etc. The facility may be a commercial facility or an institutional facility. For example, the facility may be a retail facility (e.g., a mall or a shopping center), an office facility (e.g., an office building), an event facility (e.g., a conference center), an amusement park, a theme park, a transportation facility (e.g., an airport, a bus terminal, etc.), an educational facility (e.g., a school or a university campus), or a medical facility (e.g. a hospital). The facility may be an indoor facility, an outdoor facility, and/or may include a combination of indoor and outdoor portions. The systems described herein may be particularly useful for indoor facilities and/or facilities with at least some indoor portions.

The facility units in the facility may be any type of suitable facility units. For example, the facility units may be commonly managed as part of the facility. Some examples of facility units include stores, restaurants, booths, offices, rooms, halls, washrooms, airport gates, and/or locations or areas within the facility. A given facility may include only a single type of facility units or a mixture of different types of facility units.

The facility may include a facility system, such as those described in U.S. Pat. Nos. 9,702,706, and 10,156,446 which are hereby incorporated by reference in its entirety.

In the illustrated example of FIG. 1, the system 100 includes a server platform 110, which communicates with a plurality of map creator devices 112, and a plurality of non-creator devices 114, via a communication network 116. The map creator device 112 is associated with a map creator user. The non-creator device 114 is associated with a user that is not a map creator, such as a facility operator or the like.

The server platform 110 may be a purpose-built machine designed specifically for implementing a system and method for cartographic semantic segmentation of at least one image.

The server platform 110, map creator devices 112, and non-creator devices 114, may be a server computer, desktop computer, notebook computer, tablet, PDA, smartphone, or another computing device. The devices 110, 112, and 114 may include a connection with the communication network 116 such as a wired or wireless connection to the Internet. In some cases, the communication network 116 may include other types of computer or telecommunication networks. The devices 110, 112, and 114 may include one or more of a memory, a secondary storage device, a storage component, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of devices 110, 112, and 114 may execute applications, computer readable instructions or programs. The applications, computer readable instructions or programs may be stored in memory or in secondary storage, or may be received from the Internet or other communication network 116. Input device may include any device for entering information into devices 112 and 114. For example, input device may be a keyboard, keypad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, devices 110, 112, and 114 may include multiple of any one or more of processors, applications, software modules, second storage devices, network connections, input devices, output devices, and display devices.

Although devices 110, 112, and 114 are described with various components, one skilled in the art will appreciate that the devices 110, 112, and 14 may in some cases contain fewer, additional or different components. In addition, although aspects of an implementation of the devices 110, 112, and 114 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the devices 110, 112, and 114 and/or processor to perform a particular method.

In the description that follows, devices such as server platform 110, map creator devices 112, and non-creator devices 114 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 112 and 114 may send information to and receive information from the server platform 110. For example, a map creator using map creator device 112 may manipulate one or more input devices (e.g. a mouse and a keyboard) to interact with a user interface displayed on a display of the map creator 112 to input information and view and process system outputs. Generally, the device may receive a user interface from the communication network 116 (e.g. in the form of a webpage). Alternatively, or in addition, a user interface may be stored locally at a device (e.g. a cache of a webpage or a mobile application).

Server platform 110 may be configured to receive a plurality of information, from each of the plurality of map creator devices 112 or non-creator devices 114. The map creator devices 112 and non-creator devices 114 may be referred to herein as user computing devices, or computing devices. Generally, the information may comprise at least an identifier identifying the user who may be associated with a store, associated with a facility, an administrator of the system, an emergency service provider of the facility, or visitor of the store or facility. For example, the information may comprise one or more of a username, e-mail address, password, or social media handle.

In response to receiving information, the server platform 110 may store the information in a storage database. Generally, the storage database may be any suitable storage device such as a hard disk drive, a solid state drive, a memory card, or a disk (e.g. CD, DVD, or Blu-ray etc.). Also, the storage database may be locally connected with server platform 110. In some cases, storage database may be located remotely from server platform 110 and accessible to server platform 110 across the communication network 116 for example. In some cases, storage database may comprise one or more storage devices located at a networked cloud storage provider.

The map creator 112 may be associated with a map creator account. Similarly, the non-creator device 114 may be associated with a non-creator account. Any suitable mechanism for associating a device with an account is expressly contemplated. In some cases, a device may be associated with an account by sending credentials (e.g. a cookie, login, or password etc.) to the server platform 110. The server platform 110 may verify the credentials (e.g. determine that the received password matches a password associated with the account). If a device is associated with an account, the server platform 110 may consider further acts by that device to be associated with that account.

The devices 112 and 114 and the server platform 110 may communicate asynchronously, for example, by using an implementation of the WebSocket protocol, such as Socket.IO. Updates may be sent from the server platform 112 to each of the devices 112 and 114 in real time as interrupts, i.e., without polling. Likewise, user interaction data may be sent from each of the devices 12 and 114 to the server platform 110 in real time as interrupts, i.e., without polling.

In at least one embodiment, map creator device 112 may receive a request for map creation in the form of data from a non-creator device 114 through network 116, and then send that data to server platform 110 through network 116. In at least one other embodiment, non-creator device 114 may send data directly to server platform 110 without first being received by map creator device 114, to initiate a process of map creation.

Figure 2:
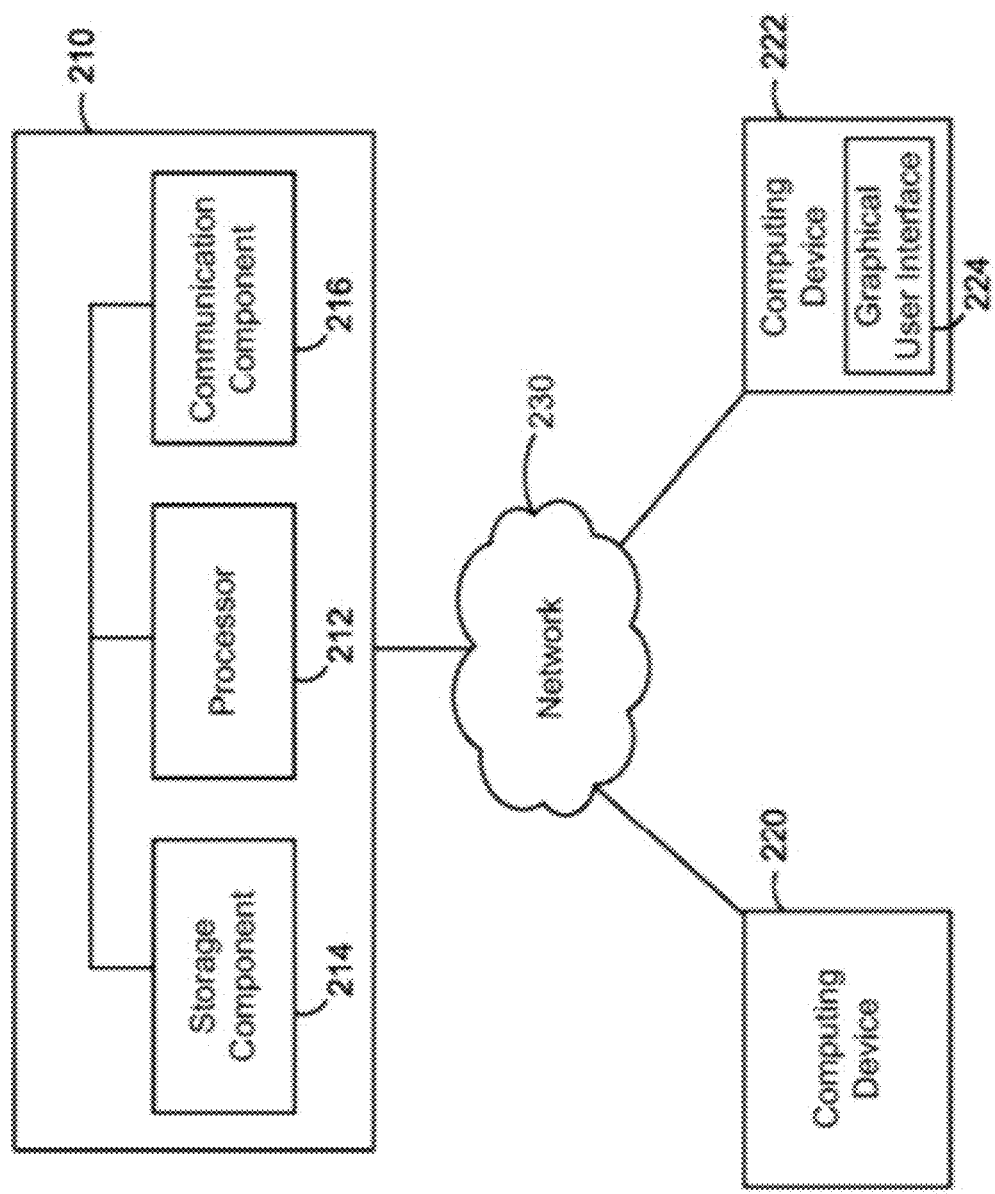
FIG. 2 is a block diagram of a system for creating a labelled geometry for a wayfinding map using semantic segmentation, in accordance with at least one embodiment.

Referring now to FIG. 2, shown therein is a block diagram 200 of an example semantic segmentation system 210 providing a map creation tool in communication with computing devices 220 and 222 via a network 230, according to an embodiment.

Computing devices 220 and 222 may be associated with administrator accounts (similar to map creator accounts discussed in FIG. 1). Although two computing devices 220 and 222 are shown in FIG. 2, the system 210 can be in communication with fewer or more computing devices 220 and 222. The system 210 can communicate with the computing devices 220 and 222 over a wide geographic area via the network 230. Computing devices 220 and 222 may be similar to map creator devices 112 and non-creator devices 114 of FIG. 1.

As shown in FIG. 2, the system 210 includes a processor 212, a storage component 214, and a communication component 216. The system 210 may include one or more servers that may be distributed over a wide geographic area and connected via the network 230. In some embodiments, each of the processor 212, the storage component 214 and the communication component 216 may be combined into a fewer number of components or may be separated into further components.

The processor 212 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the system 210. In some embodiments, the processor 212 can include more than one processor with each processor being configured to perform different dedicated tasks.

The processor 212 may be configured to control the operation of the system 210. The processor 212 can include modules that initiate and manage the operations of the system 210. The processor 212 may also determine, based on received data, stored data, and/or user preferences, how the system 210 may generally operate.

The communication component 216 may be any interface that enables the system 210 to communicate with other devices and systems. In some embodiments, the communication component 216 can include at least one of a serial port, a parallel port or a USB port. The communication component 216 may also include at least one of an Internet, Local Area Network (LAN), Ethernet, Firewire, modem, fiber, or digital subscriber line connection. Various combinations of these elements may be incorporated within the communication component 216.

For example, the communication component 216 may receive input from various input devices, such as a mouse, a keyboard, a touch screen, a thumbwheel, a track-pad, a track-ball, a card-reader, voice recognition software and the like depending on the requirements and implementation of the system 210.

The storage component 214 can include RAM, ROM, one or more hard drives, one or more flash drives or some other suitable data storage elements such as disk drives, etc. The storage component 214 is used to store an operating system and programs, for example. For instance, the operating system provides various basic operational processes for the processor 212. The programs include various user programs so that a user can interact with the processor 212 to perform various functions such as, but not limited to, the semantic inference processes described herein.

The storage component 214 may include one or more databases (not shown). The storage component 214 stores the input and output data that the system receives and generates, e.g. source image data or created maps.

Electronic maps as analyzed and labelled by the system 100 and as described herein may include any two-dimensional or three-dimensional representation of a facility or location. The electronic maps may have any size and resolution.

The computing devices 220 and 222 may be any networked device operable to connect to the network 230. A networked device is a device capable of communicating with other devices through a network such as the networks 116, 230. A network device may couple to the network 230 through a wired or wireless connection.

The computing devices 220 and 222 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. In some embodiments, the computing devices 220 and 222 may be a laptop, a smartphone device, or a wearable device (e.g., a smart watch, smart glasses) equipped with a network adapter for connecting to the Internet. In some embodiments, the connection request initiated from the computing devices 220 and 222 may be initiated from a web browser and directed at the browser-based communications application on the system 210.

The computing device 222 may include a graphical user interface (GUI) 224. GUI 225 can be integral or separate from computing device 222. Although only computing device 222 is shown in FIG. 1 as having a GUI 224, more computing devices 220 can include a GUI 224.

The network 230 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the system 210 and the computing device 220 and 222.

As noted above, the system 210 of FIG. 2 can include one or more servers that may be distributed over a wide geographic area and connected via the network 230 and each of the processor 212, the storage component 214 and the communication component 216 can be separated into further components.

The present application describes a system for semantic segmentation of a source image in which a source image is converted to a labelled image based on usage classification of partitions of the image. The source image may be a vector graphic or a raster graphic. A source raster graphic may be a "high-resolution" image, having a resolution that is too great for semantic segmentation by the system, or the source raster graphic may have a resolution within a resolution range that allows for semantic segmentation ("fixed-resolution").

From original image to labelled image the graphic data may go through processes including partition identification and identifier detection. From original image to labelled image the graphic data undergoes pixel classification (semantic inference) and partition labelling. Semantic inference uses a trained artificial intelligence network, e.g. a neural network, to determine a usage class for each pixel of an image. Partition labelling labels each partition of the image based on the most common pixel classification within the partition.

Different processes within the semantic segmentation system may require different graphic formats depending on the specific requirements of the process. For example, partition identification may require a vector graphic if it is performed by a polygon tracing application (see FIG. 4). When the source image is a raster graphic of any resolution, the raster graphic may first be converted to a vector graphic for use in processes that require a vector format. When the source image is a vector graphic, the vector graphic may require conversion to a fixed-resolution raster graphic for some processes, such as pixel classification (see FIGS. 3 and 4). Some processes may not have graphic format requirements (raster vs. vector), such as identifier detection (see FIG. 4).

Figure 3:
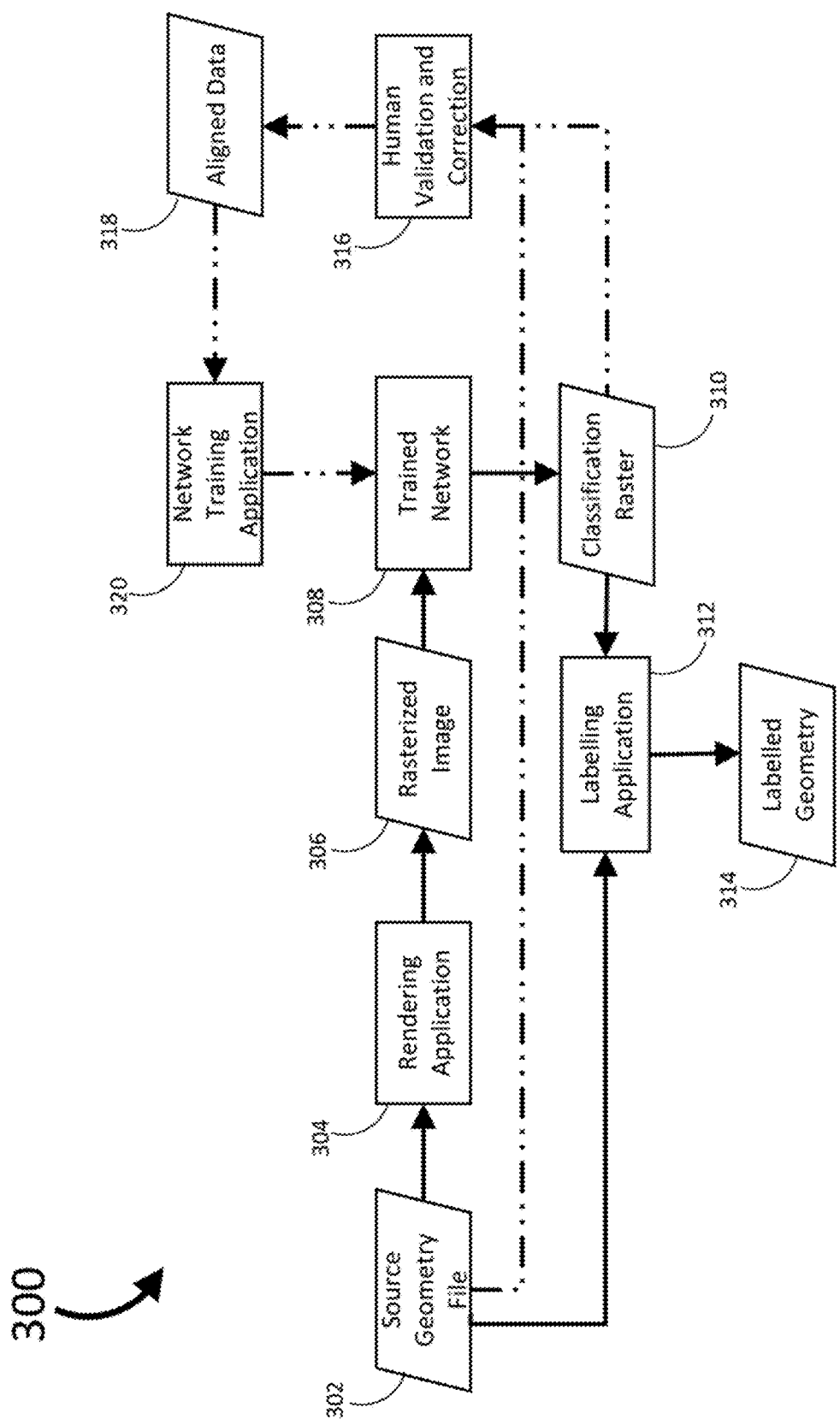
FIG. 3 is a flow diagram of a system for semantic segmentation of at least one source image using artificial intelligence, in accordance with at least one embodiment.

Referring now to FIG. 3, shown therein is a flow diagram of a system 300 for semantic segmentation of a location from at least one source image using artificial intelligence, in accordance with an embodiment. The system 300 and the process flow illustrated in FIG. 3 may be implemented by the semantic inference system 100 of FIG. 1, and in particular by server 110 of FIG. 1.

The system 300 is configured to receive one or more images of a location and classify different regions of the location to create a map or image which is partitioned and labelled by region.

Example classifications generated by the system 300 may include parking lot, park or green/space, sidewalks, stairs, ramps, rooms within buildings, and the like.

The flow diagram of system 300 includes both inputs and outputs represented by rhomboids and applications or processes represented by rectangles. The system 300 operates as follows.

A source geometry file 302 is input into a rendering application 304. The source geometry file may include one or more images of the location (e.g. a site plan). The source geometry file may be in any suitable format. The source geometry file may be a vector image having any suitable format (e.g. dwg, dxf, pdf, etc.). The source geometry file may be a raster image having any suitable format (e.g. png, jpg, etc.).

In the embodiment of FIG. 3 the example source geometry file is a single schematic image of the location. The location includes a plurality of regions to be classified by the system 300.

The rendering application 304 renders source geometry file 302 into a fixed-resolution rasterized image 306. "Fixed-resolution" refers to the highest resolution at which system 300 can classify an image. The rendering application 304 may be implemented by a computer system such as system 210 of FIG. 2.

System 300 may have limitations on the file size which can be classified and labelled using semantic segmentation. For example, the image used for classification may be limited to a resolution no greater than 256×256. In such a case, a source geometry file that is in a vector format or is in a raster format greater than 256×256 may require conversion to a fixed-resolution raster 256×256 or below. Accordingly, source geometry file 302 may be a "high-resolution" raster image (i.e. a raster image having a resolution greater than the fixed-resolution of system 300) which is converted to a fixed-resolution raster image 306. Source geometry file 302 may be a vector image which is converted to a fixed-resolution raster image 306. Source geometry file 302 may be a "lower-resolution raster image" (i.e. an image with a resolution below the fixed-resolution of system 300) which does not require conversion. FIG. 3 describes the process for a source geometry file which requires conversion.

Rasterized image 306 is input into a trained neural network 308. The neural network 308 is configured to generate a classification raster image 310. That is, trained neural network 308 assigns a class to each pixel of rasterized image 306 based on the previous training of the neural network to recognize a plurality of classes for such an image.

In the embodiment of FIG. 3, the artificial intelligence which classifies rasterized image 306 is a trained neural network. In other embodiments a different type of artificial intelligence may be used. In other embodiments, a plurality of neural networks may be used. In variations, other types of artificial intelligence classification networks or machine learning models may be used, such as conditional random fields (CRFs).

The neural network 308 includes an input layer, an output layer, and at least one hidden layer. The neural network 308 is configured to receive an image at the input layer and generate a per pixel classification at the output layer.

The neural network 308 may be a convolutional neural network. The neural network 308 may be a generator network from a Generative Adversarial Network The neural network 308 may be configured to receive at an input layer an input black/white line art image of a location (e.g. building exterior layout, interior layout, or both) and generate at an output layer a per pixel spatial classification.

The neural network 308 may be trained according to a training process. The training process may include providing a neural network with training data. The training data may include pairs of images including an unlabeled input image and a labelled output. With each additional set of training images the network receives, the network can "learn" specific characteristics of a pixel or region which indicate a given classification.

The trained neural network 308 and of other embodiments discussed herein, may be trained as one network of a Conditional Generative Adversarial Network (GAN). Generative Adversarial Networks place two networks in competition, where one generates 'forgeries' (generator network) and the other attempts to determine whether a given input is originally part of the training set or a 'forgery' (discriminator network). The results are then used to make both networks better at their individual tasks. The "conditional" aspect of the training refers to the networks also taking an input that (pre)conditions the output. In the present application, the conditioning input may be a line art rendering of a map/schematic/floor plan. Conditioned on this input the generator network may infer classifications for each pixel and outputs the generated classifications. The discriminator network takes the output (or the known true classification) and the conditioning image and returns whether it infers the input to be a forgery or not.

The system 300 inputs classification raster image 310 into a labelling application 312. The labelling application 312 may also be a part of a computer system which may be identical or similar to system 210 of FIG. 2. The system 300 also inputs the source geometry file 302 into labelling application 312.

Labelling application 312 uses the pixel classifications of classification raster 310 to label source geometry file 302 to generate a labelled geometry image 314. That is, labelling application 312 uses the classification of the pixels to classify and label larger areas or partitions of source geometry file 302 to create labelled geometry image 314.

In an embodiment, the labelled areas or partitions of source geometry file 302 may be pre-determined by a second artificial intelligence system configured to trace polygons onto the source geometry file 302 image. The traced polygons represent distinct partitions or areas in the image. The areas may be determined by a process as described in U.S. Patent Application No. 62/859,251 (incorporated herein by reference). The areas may be pre-determined by a human who traces polygons for distinct areas. The areas may be determined as additional steps in the process of FIG. 3 using a computer application specifically configured to perform the task. This computer application may be another artificial intelligence network such as a neural network.

The above discussed process represents a first part of system 300 marked by solid line arrows between components. A second part of system 300 marked by dot-dot-dash line arrows uses source geometry file 302 to provide further training for trained neural network 308.

In the second part of system 300, source geometry file 302 and classification raster image 310 are cross-referenced to generate aligned data 318. The pixel classification of classification raster image 310 is validated and/or corrected by a human into the aligned data 318.

The system 300 inputs the aligned data 318 into a network training application 320. The network training application 320 may use aligned data 318 to improve the accuracy of trained network 308.

In other embodiments of a semantic segmentation system, certain components may require a vectorized representation to function. In such a case, the system may receive a source image in raster format and vectorize the raster source image (i.e. generate a vector image based on the raster source image). The vector image can be inputted into the component requiring the vector representation (e.g. polygon tracing 434 of FIG. 4).

In some cases, components of the system may operate using non-vector images. For example, the system may implement semantic inference and/or identifier detection (e.g. identifier detection 440) functionalities using non-vector images. The system may make vector and non-vector input images co-equal input options. This may be done, for example, by passing a non-vector source image (e.g. high-resolution raster image 402 of FIG. 4) directly to an identifier detection component (e.g. identifier detection 440 of FIG. 4), while pre-processing the non-vector source image to generate a vector image (e.g. vector image 428 of FIG. 4) that can be input into the vector-requiring component (e.g. polygon tracing 434 of FIG. 4).

Figure 4:
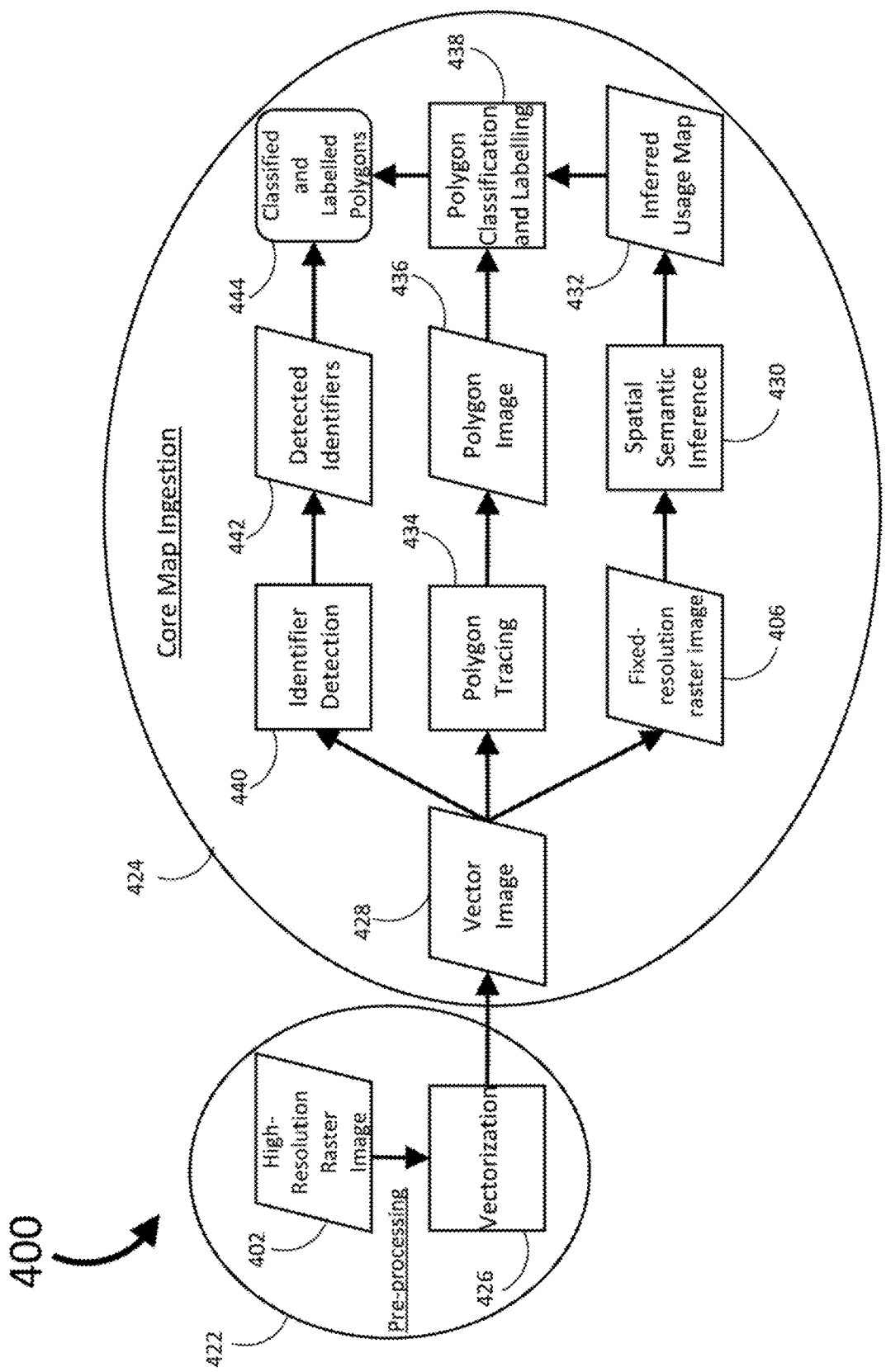
FIG. 4 is a flow diagram of a system for semantic segmentation of at least one source image using artificial intelligence including conversion of the source image(s) to labelled polygons, in accordance with at least one embodiment.

Referring now to FIG. 4, shown therein is a flow diagram of a process 400 for semantic segmentation of at least one source image using artificial intelligence, including conversion of the source image to labelled polygons, in accordance with an embodiment. The process 400 may be implemented, at least in part, by server 110 of FIG. 1, system 200 of FIG. 2, or system 300 of FIG. 3, described above.

Parts of the process 400 may be similar to the functionality of system 300 of FIG. 3. The process 400 or portions thereof may be performed by the system 300 of FIG. 3. Similar to FIG. 3, input and output data is represented by rhomboids, while applications or processes are represented by rectangles.

Process 400 includes two parts: pre-processing 422 and core map ingestion 424.

Pre-processing 422 may be required if the source image is a high-resolution raster image such as high-resolution raster image 402. This is the case where the resolution of the source raster image is greater than the fixed-resolution that is supported by the artificial intelligence which is labelling the image. The fixed resolution is the highest resolution which can be classified by process 400. For example, the supported resolution may be no greater than 2048×1024 pixels. Therefore, any raster source image with a resolution greater than 2048×1024 would be a "high-resolution" raster image.

In such a case, the high-resolution raster image 402 is converted to a vector image by a vectorization process 426. The output of the vectorization 426 is a vector image 428. Vector image 428 is then input into the core map ingestion process 424.

Vectorization process 426 may include basic cleaning or normalization of the image to reduce noise (e.g. specks), completion of any broken lines, and then a final vectorizing process such as marching lines.

When the source image input into the system is already in a vector format like vector image 428 (e.g. svg, dxf, dwg, etc.) pre-processing and vectorization is not required.

Vector image 428 is processed according to a first pathway, a second pathway, and a third pathway.

The first pathway is a semantic inference process and includes fixed-resolution raster image 406, spatial semantic inference 430, and inferred usage map 432.

The second pathway is a polygon tracing process and includes polygon tracing 434 and polygon image 436.

The third pathway is an identifier pathway and includes identifier detection 440 and detected identifiers 442.

The first pathway includes converting the vector image 428 to a fixed-resolution raster image 406 (similar to rasterized image 306 of FIG. 3). The conversion process may be carried out by a rendering application such as rendering application 304 of FIG. 3.

Fixed-resolution raster image 406 is then classified by pixel by spatial semantic inference 430, creating an inferred usage map 432. That is, a spatial semantic inference application which is part of an artificial intelligence network, for example a trained neural network (e.g. network 308 of FIG. 3), classifies each pixel of fixed-resolution raster image 406 into a specific usage class. Usage classes may be inferred from a source image (e.g. high-resolution raster image 402) or may be indicated by a human when inputting the source image. Inferred usage map 432 includes a usage classification for each pixel.

The second pathway includes tracing polygons onto vector image 428. Polygon tracing 434 is performed to generate a polygon image 436 from vector image 428.

Polygon image 436 includes polygons representing distinct partitions or areas within the image 436. The distinct areas may include rooms, hallways, parking lots, parking structures, parks, driveways, sidewalks, or the like. Polygon tracing 434 may be performed using a process similar to those described in U.S. Patent Application No. 62/859,251.

The first semantic spatial inference pathway and the second pathway meet at t a polygon classification and labelling 438. Polygon classification and labelling 438 combines the information for each pixel from inferred usage map 432 with the information about each polygon from polygon image 438. That is, each polygon is assigned a usage class (i.e. a polygon usage class) based on the most common pixel classification (i.e. pixel usage class) within that polygon. The usage class for a polygon may be determined based on the majority usage class of the pixels making up the polygon.

The third pathway includes the process of detecting identifiers from vector image 428.

Identifier detection 440 identifies identifier information in the image. The identifier information includes information in the image that may provide context or information about the usage of partitions or areas in the image. The identifier information may include text or other non-text identifiers (e.g. symbols like arrows, parking lines, etc.). In some cases, identifying information may have been encoded into the source image. The identifier information is applied to vector image 428 to create a detected identifiers file 442.

The detected identifiers 442 and the combined polygon classification and labelling 438 are used to generate classified and labelled polygons 444. Together, detected identifiers 442 and the combined polygon classification and labelling 438 of inferred usage map 432 and polygon image 436 creates classified and labelled polygons 444. The classified and labelled polygons may be output as a classified and labelled geometry file where the polygons and their classification and label can be visualized or may be information which is stored in memory and can be applied, in the future, to various files which concern the location of the source image.

Figure 5A:
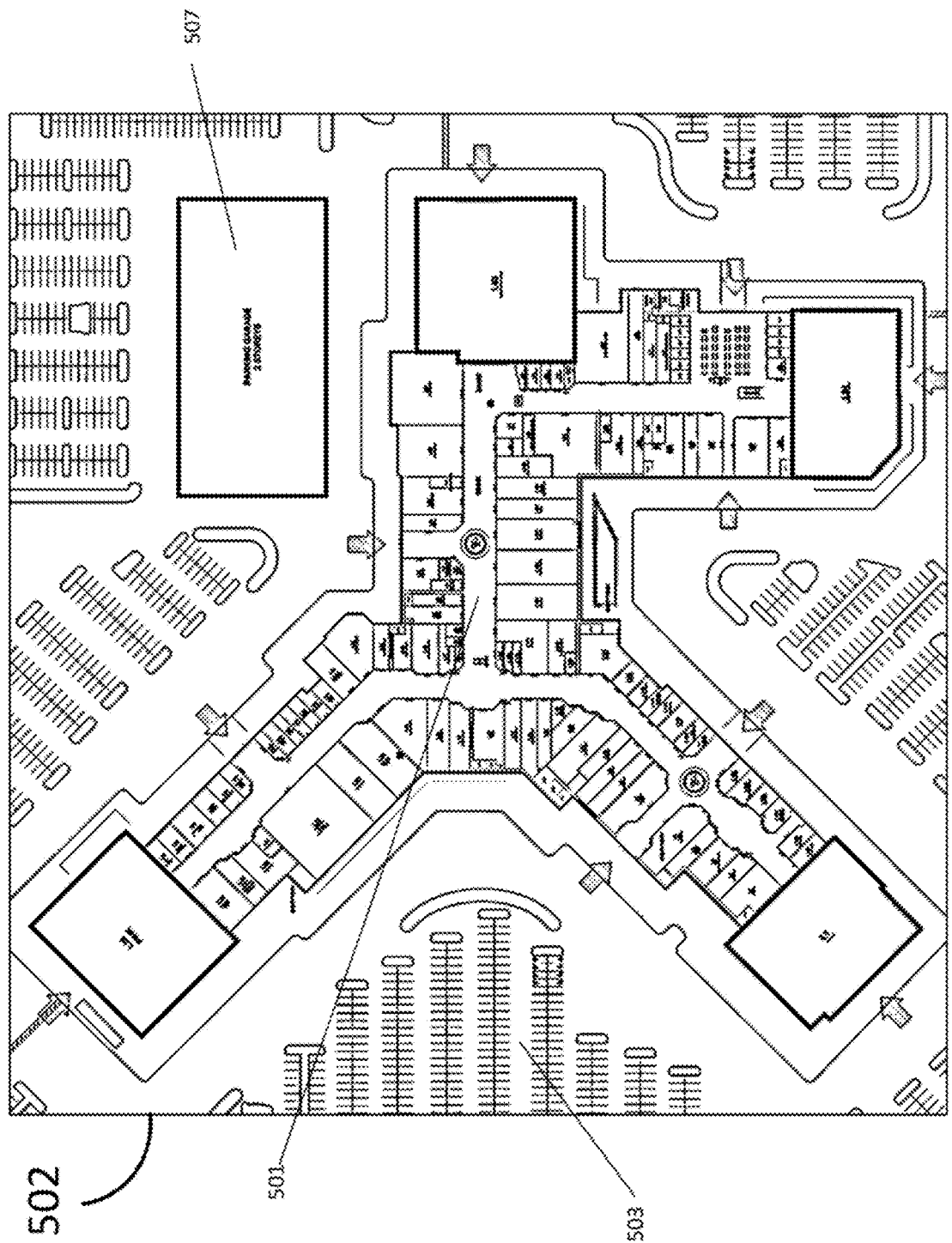
FIG. 5A is an example source geometry image for a system for semantic segmentation of a source image, in accordance with at least one embodiment.

FIG. 5A is an example source geometry image 502 for a system of semantic segmentation from a source image, in accordance with at least one embodiment. Source geometry image 502 may be used as source geometry file 302 of FIG. 3.

Source geometry image 502 is a high-resolution birds-eye view image of a location. Image 502 includes a large building 501 in the middle surrounded by parking lots 503 and a parking structure 507. "High-resolution" refers to the image having a greater resolution than the classifying system can analyzes, as discussed above in reference to FIG. 4.

Figure 5B:
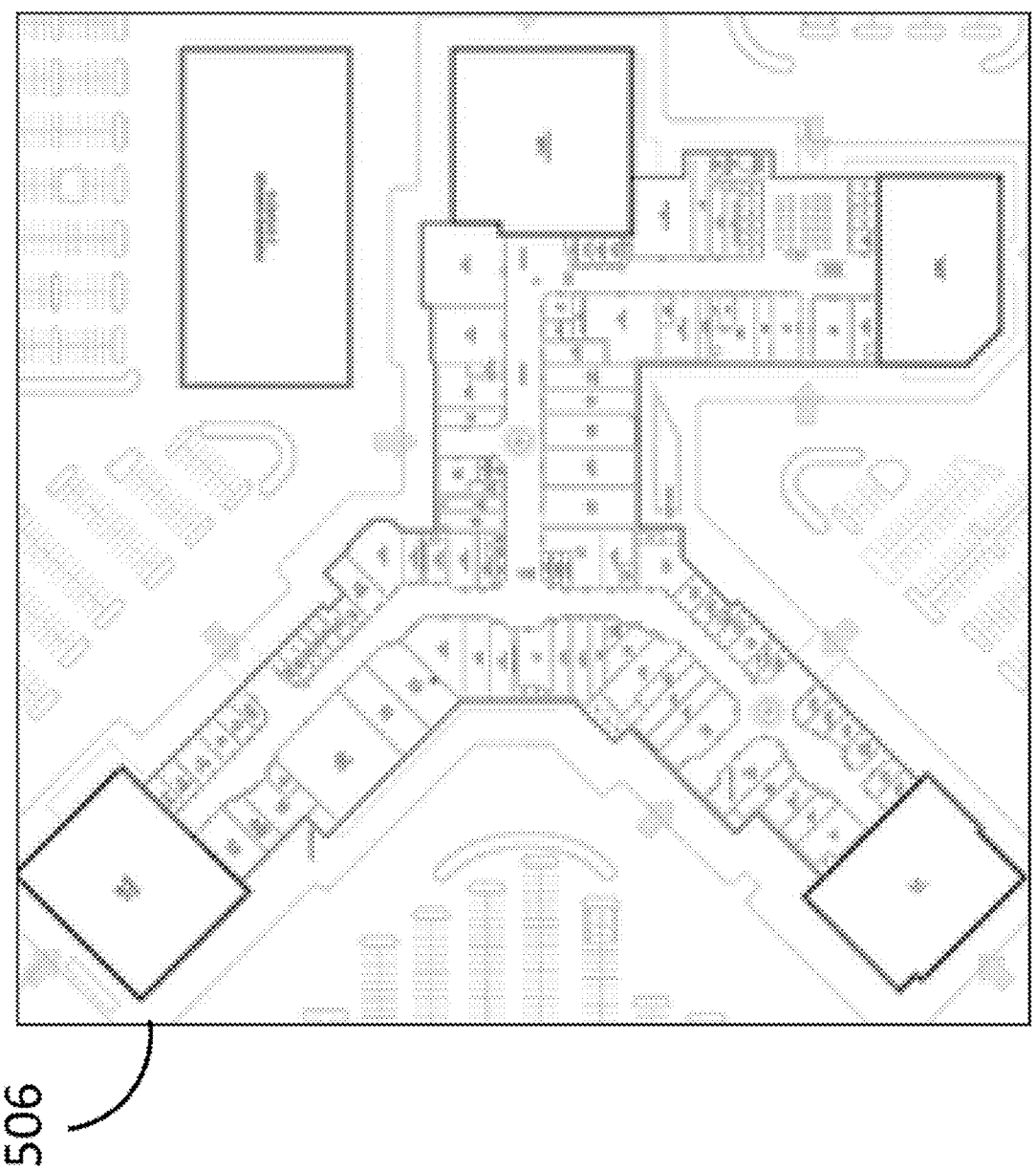
FIG. 5B is an example rasterized image of a system for semantic segmentation of a source image, in accordance with at least one embodiment.

FIG. 5B is an example rasterized image 506 of a system of semantic segmentation from a source image, in accordance with at least one embodiment.

Rasterized image 506 may be created from source geometry image 502 by a rendering application similar to rendering application 304 of FIG. 3 or a rasterization application similar to that discussed for FIG. 4.

The rasterized image 506 is a lower resolution and smaller size than source geometry image 502. The system or neural network which classifies and labels an input image may have an image size limit which requires a lower resolution and/or smaller sized image.

For example, the system may only be able to classify an image with resolution 2048×1024 or less. This may require the source image 502 to be redrawn to fit the accepted resolution.

Where the source geometry image 502 is a vector image the image may be converted to a raster image with a resolution at or below the resolution limit of the system.

Where the source geometry image 502 is a raster image the image may be converted to a lower resolution when necessary. That is, a source geometry image that is already a raster image and already within the resolution limits of the system the source geometry image 502 may not require any changes.

Figure 5C:
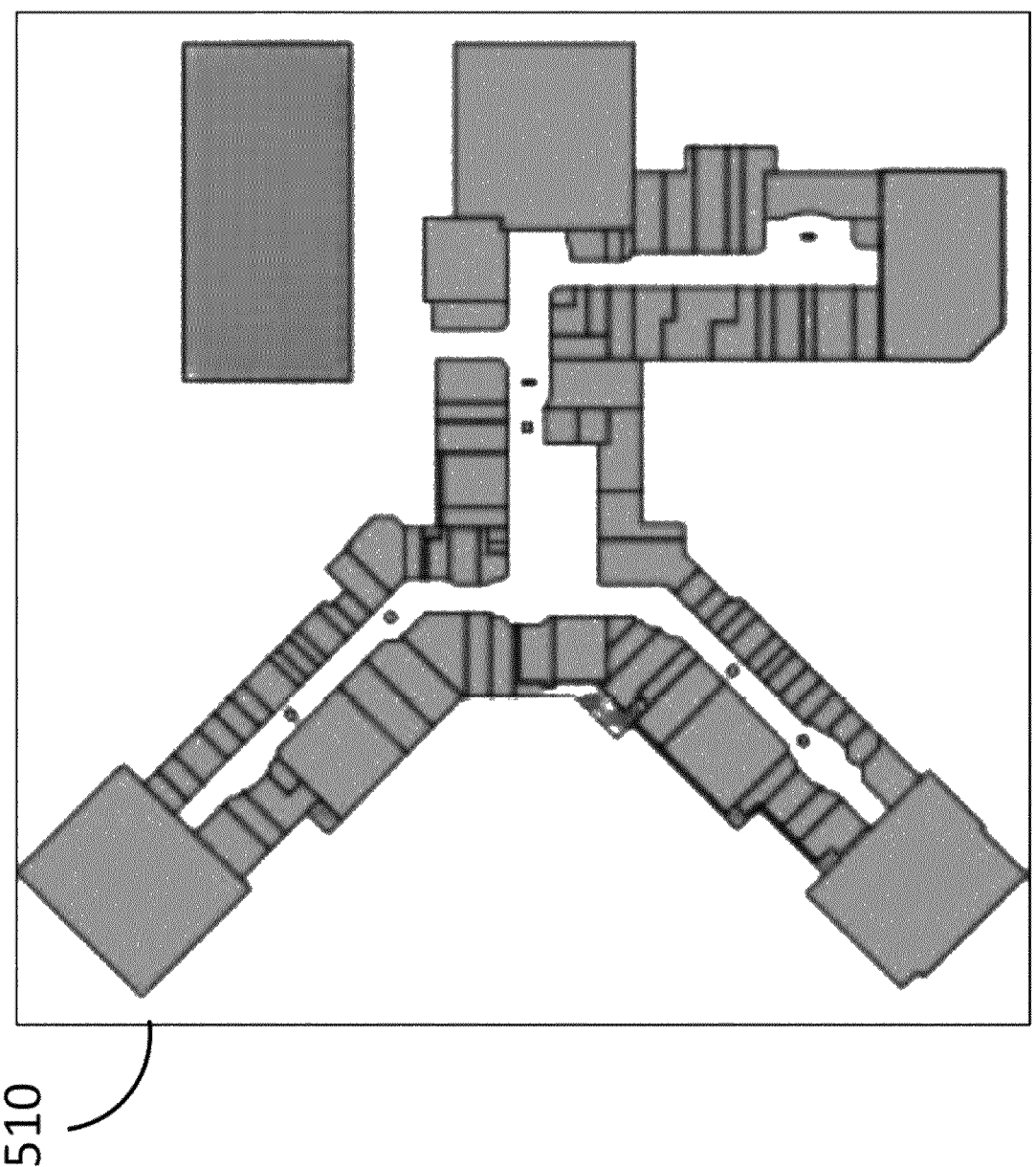
FIG. 5C is an example classification raster image of a system for semantic segmentation of a source image, in accordance with at least one embodiment.

FIG. 5C is an example classification raster image 510 of a system for semantic segmentation of a source image, in accordance with at least one embodiment.

Classification raster image 510 is created from rasterized image 506 of FIG. 5B. Each pixel of rasterized image 506 may be classified by an artificial intelligence network, such as a neural network trained for the task (e.g. trained neural network 308 of FIG. 3).

In FIG. 5C, pixels are colored to show the classification. For classification raster image 510 dark grey pixels are parking garage, green pixels are destinations, and red pixels are garden/greenery. Accordingly, in some embodiments different pixel usage classifications may be given distinct identifiers. The identifiers may be rendered or applied to the output image. The identifier may be a visual identifier, such as a color. The identifier may allow a user to process the results of the pixel classification process more easily and efficiently. The identifier may also make the output image more visually appealing.

Figure 5D:
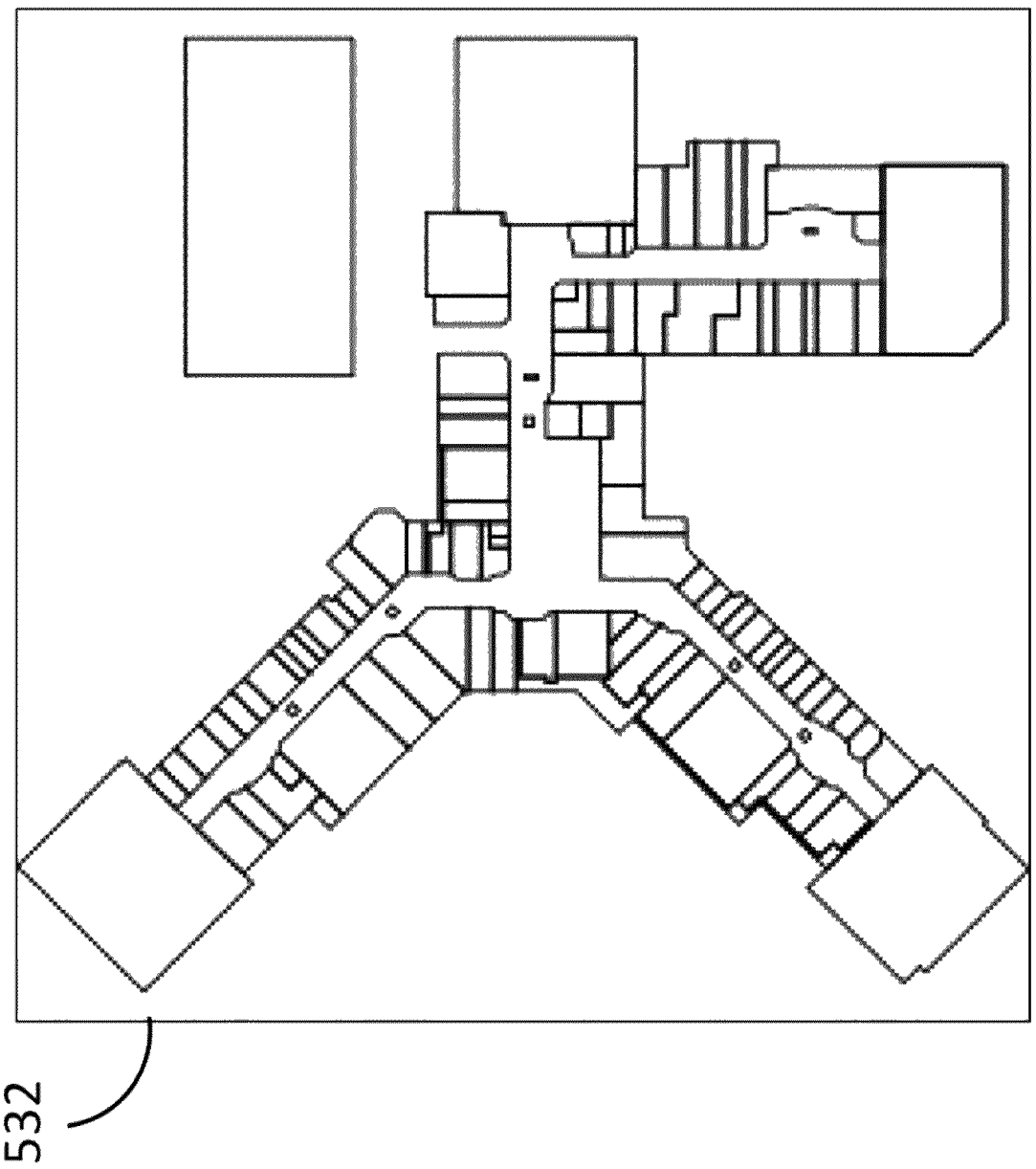
FIG. 5D is an example source geometry labelled polygon image of a system for semantic segmentation of a source image, in accordance with at least one embodiment.

FIG. 5D is an example source geometry labelled polygon image 532 for a system of semantic segmentation from a source image, in accordance with at least one embodiment.

Source geometry labelled polygon image 532 includes all partitions or polygons of source geometry image 502 which were labelled. The polygons may be traced onto the image after acquiring source geometry image 502 by a tracing process, method, or system such as discussed in U.S. Patent Application No. 62/859,251. The polygons may be applied by an artificial intelligence network which may be trained to recognize labels (e.g. text) and partitions/areas and trace polygons on source geometry image 502. The polygons may have already existed within the data of source geometry image 502.

Figure 5E:
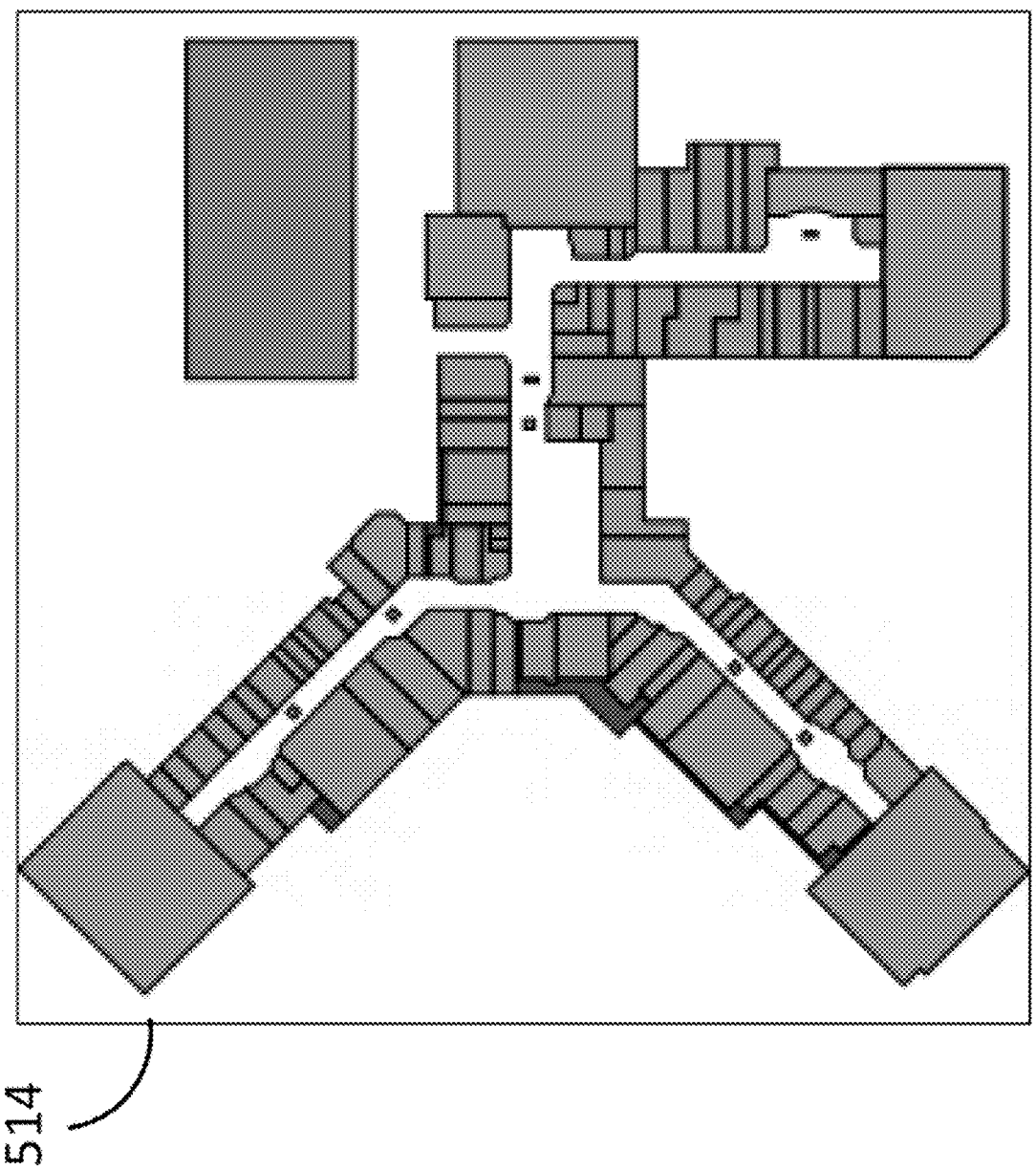
FIG. 5E is an example labelled geometry image of a system for semantic segmentation of a source image, in accordance with at least one embodiment.

FIG. 5E is an example labelled geometry image 514 of a system for semantic segmentation of a source image, in accordance with at least one embodiment.

Labelled geometry image 514 is created by a labelling application (e.g. labelling application 312 of FIG. 3). The labelling application combines the information from classification raster image 510 and source geometry labelled polygon image 532. That is, each polygon recognized by the labelling application is assigned a usage class based on the classification of pixels within that polygon.

In an embodiment, the majority pixel classification for the polygon (i.e. whichever usage class was assigned to a majority of the pixels making up the polygon) is assigned as a polygon usage class to that polygon.

Figure 6:
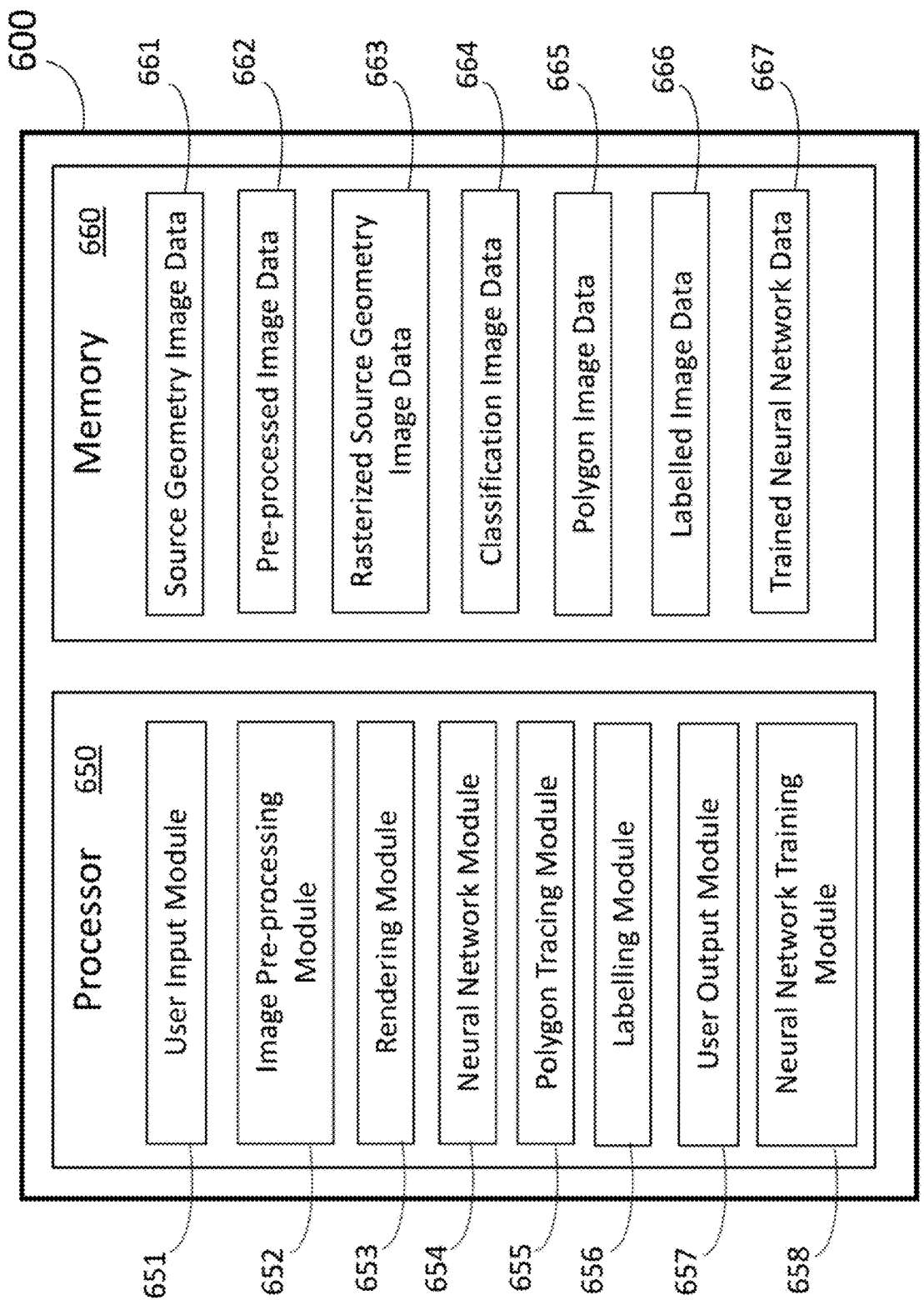
FIG. 6 is a block diagram of a computer system for semantic segmentation, in accordance with at least one embodiment.

FIG. 6 is a block diagram of a processor and memory used in a computer system for semantic segmentation, in accordance with at least one embodiment.

Referring now to FIG. 6, shown therein is a block diagram of a computer system 600 for performing semantic segmentation, according to an embodiment. The computer system 600 may be configured to implement the processes described herein, such as process 300 of FIG. 3 and process 400 of FIG. 4. The computer system 600, or components thereof, may be implemented at server 110 of FIG. 1.

The computer system 600 includes a processor 650 and a memory 660. The processor 650 is in communication with the memory 660. Computer system 600 may include other components beyond processor 650 and memory 660.

Memory 660 may have instructions stored thereon which, upon execution by the processor 650, cause computer system 600 to perform the functions of methods or processes discussed herein including those discussed in FIG. 3, FIG. 4, FIG. 5A, FIG. 5B, FIG. 5C, FIG. 5D, and FIG. 5E.

Processor 650 includes a user input module 651, an image pre-processing module 652, a rendering module 653, a neural network module 654, a polygon tracing module 655, a labelling module 656, a user output module 657, and a neural network training module 658.

Memory 660 includes source geometry image data 661, pre-processed image data 662, rasterized source geometry image data 663, classification image data 664, polygon image data 665, labelled image data 666, and trained neural network data 667.

Neural network module 654 may perform similar tasks to trained network 308 of FIG. 3.

Polygon tracing module 655 may perform similar tasks to the polygon tracing 434 of FIG. 4.

Labelling Module 656 may perform similar tasks to labelling application 312 of FIG. 3.

Neural network training module 658 may perform similar tasks to network training application 320 of FIG. 3.

Source geometry image data 661 may be similar to source geometry file 302 of FIG. 3 and high-resolution raster image 402 of FIG. 4.

Pre-processed image data 662 may be similar to vector image 428 of FIG. 4.

Rasterized source geometry image data 663 may be similar to rasterized image 306 of FIG. 3 and fixed-resolution raster image 406 of FIG. 4.

Classification image data 664 may be similar to classification raster 310 of FIG. 3 and inferred usage map 432 of FIG. 4.

Polygon image data 665 may be similar to polygon image 436 of FIG. 4.

Labelled image data 666 may be similar to labelled geometry 314 of FIG. 3 and polygon classification and labelling 438 of FIG. 4.

Trained neural network data 667 may in part include data similar to aligned data 318 of FIG. 3.

User input module 651 receives source geometry image data 661 via a user input and stores the source geometry image data in memory 660.

Source geometry image data 661 includes at least one image of a location.

Source geometry image data 651 may require pre-processing depending on the image type of the original file. If the original file is a raster image that has a resolution greater than the resolution which computer system 600 has the capability to analyze and label, then the raster image is pre-processed to a vector image.

When the original image requires pre-processing, image pre-processing module 652 converts source geometry image data 661 to pre-processed image data 662. The pre-processed image data 662 is stored in memory 660.

The pre-processing module 652 may also be configured to perform image normalization on the received image.

Where source geometry image data 661 is a vector file that does not require pre-processing, rendering module 653 renders source geometry image data 661 to rasterized source geometry image data 663. The rasterized source geometry image data 663 is stored in memory 660.

In cases where source geometry image data 661 is a high-resolution raster converted to pre-processed image data 662, pre-processed image data 662 is rendered to rasterized source geometry image data 663 by rendering module 653.

In cases where source geometry image data 661 is a raster image with a low enough resolution to be analyzed and labelled by computer system 600, no pre-processing or rendering may be required. For clarity, source geometry image data 661 which does not require any pre-processing or rendering is included when rasterized source geometry image data 663 is discussed.

Rasterized source geometry image data 663 is classified by neural network module 654.

Neural network module 654 is part of a trained neural network which has been trained to perform the task of classifying an image by usage classes. The usage classes may include rooms, hallways, stairways, elevators, sidewalks, parking lots, parking structures, etc.

Neural network module 654 assigns a usage class to each pixel of rasterized source geometry image data 663. Neural network module 654 uses trained neural network data 667 to perform this function. The classification of each pixel is stored in memory 660 as classification image data 664.

Polygon tracing module 655 traces polygons onto distinct partitions or areas of the source geometry image to create polygon image data 665 which is stored in memory 660.

Polygon tracing module 655 uses source geometry image data 661 and a process as defined in U.S. Patent Application No. 62/859,251 to trace polygons over the source geometry image to differentiate areas of the image from one another.

While neural network module 654 classifies each pixel of rasterized source geometry image data 663 into usage classes such as rooms or hallways, polygon tracing module traces polygons around distinct areas such as rooms or hallways.

Labelling module 656 then uses classification image data 664 and polygon image data 665 to create labelled image data 666. That is, labelling module 656 determines what the most common usage class is for pixels within each polygon and labels the polygon with that usage class.

Labelled image 666 is accessed by the user through user output module 657.

Additionally, computer system 600 includes a neural network training module 658. Neural network training module 658 may use example images to train the neural network, which may increase accuracy and efficiency of the network.

Neural network training module 658 may also use source geometry image data 661 to further train neural network module 654.

Trained neural network data 667 includes data which is only used to trained neural network module 654 and any other data used by neural network module 654 to classify pixels.

Further modules may be present on processor 650 and further data may be stored in memory 660. FIG. 6 shows the modules and data for labelling a source geometry as discussed herein.

Figure 7:
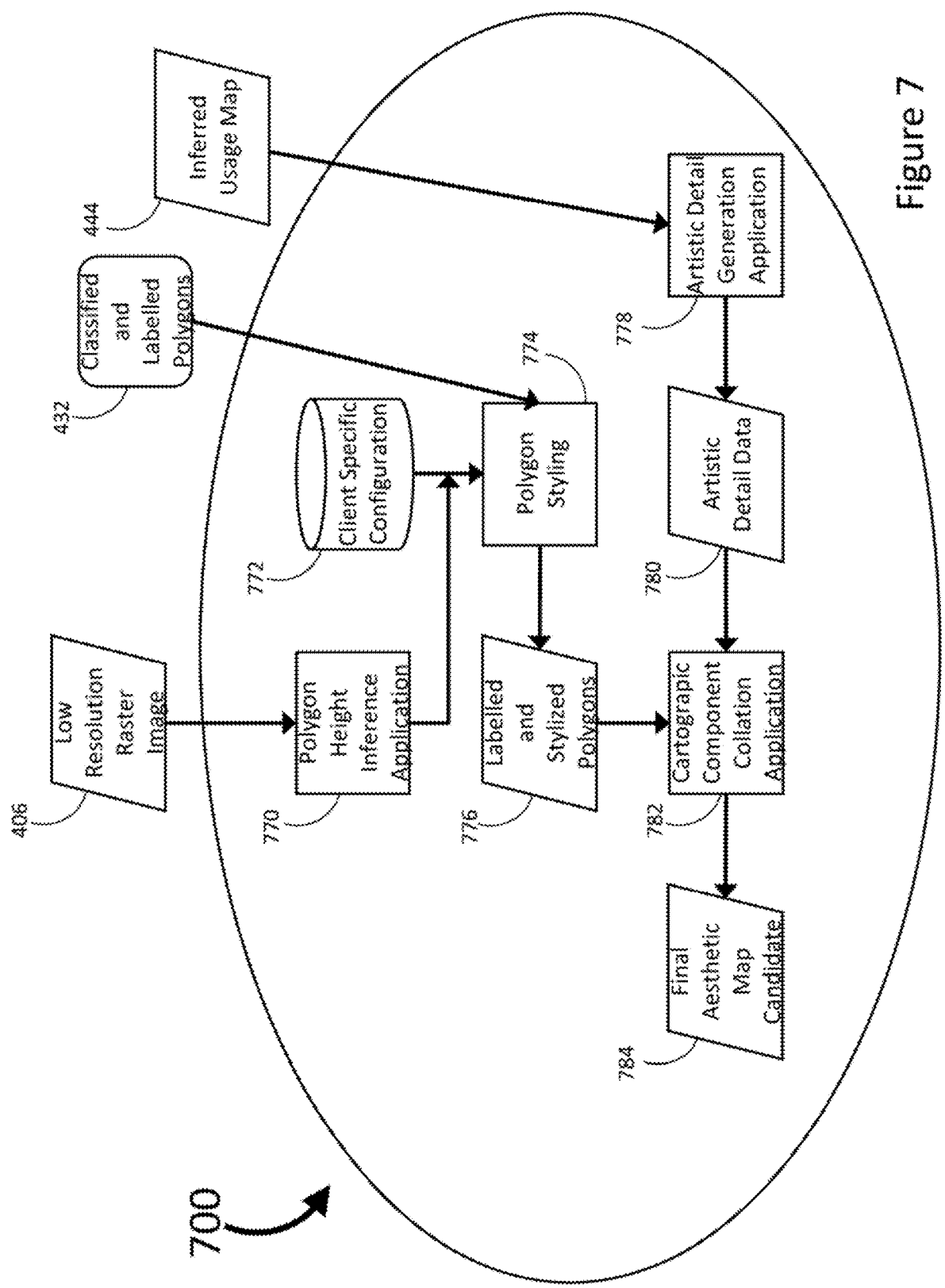
FIG. 7 is a flow diagram of a system for creating an aesthetically pleasing map from the labelled polygons of FIG. 4, in accordance with at least one embodiment.

Referring now to FIG. 7, shown therein is a flow diagram of a process 700 for creating an artistic map from the labelled polygons of FIG. 4, in accordance with at least one embodiment. The process 700 may be implemented at least in part by server 110 of FIG. 1, system 200 of FIG. 2, system 300 of FIG. 3, and system 400 of FIG. 4.

Process 700 may be implemented as a continuation from process 400 of FIG. 4.

Process 700 uses fixed-resolution raster image 406, inferred usage map 432, and classified and labelled polygons 444 of FIG. 4 as inputs.

Process 700 is illustrated as contained within an oval 700 while inputs from FIG. 4 are illustrated outside of oval 700. The flow diagram of process 700 includes both inputs and outputs represented by rhomboids and applications or processes represented by rectangles.

Fixed-resolution raster image 406 is used as an input by a polygon height inference application 770. The polygon height inference application 770 infers from the context of image 406 a height for each polygon of the polygon image 436 of FIG. 4. The inferred height may not be a real-world height but may be a height that is accurate relative to the other polygons in the polygon image 436.

The polygon height inference application 770 output (i.e. relative polygon heights) is combined with a client specific configuration 772 as an input for a polygon styling application 774. The polygon height inference application 770 may include a neural network (similar to spatial semantic inference 430) or other artificial intelligence network or machine learning model configured to produce height for 3-dimensional rendering purposes. For example, when a polygon is classified as a store polygon, the height inference application 770 "knows" that the height of the store polygon should be greater than the height of a polygon classified as a sidewalk.

Client specific configuration 772 may include any aesthetic requirements or image requirements from a client requesting creation of the map/image.

Polygon styling application 774 also receives classified and labelled polygons 432 (from FIG. 4) as an input. Polygon styling application 774 outputs labelled and stylized polygons 776. Labelled and stylized polygons 776 include the labels for each polygon as determined by process 400 as well as relative heights for each polygon. Stylizing may include colorization, line thickness and style, texture, logo application, or the like.

Inferred usage map 444 is input into an artistic detail generation application 778. This allows artistic detail generation application 778 to create artistic detail for the image based on the classification of each pixel in the inferred usage map 444.

The artistic detail generation application 778 generates artistic detail data 780. For example, where the inferred usage is a garden, the artistic detail generation application 778 may add green or plants as artistic detail.

Artistic detail data 780 is combined with labelled and stylized polygons 776 by a cartographic component collation application 782 to create a final aesthetic map candidate 784. That is, the artistic detail from artistic detail data 780 which was created based on inferred usage map 444 is added to the labelled and stylized polygons (polygons with height) to create an artistic representation of the location from the original source geometry image, for example source geometry file 302 of FIG. 3, high-resolution raster image 402 of FIG. 4, or image 500A of FIG. 5A. This process may be performed automatically and with little to no human intervention, such as via an artificial intelligence network.

Figure 8A:
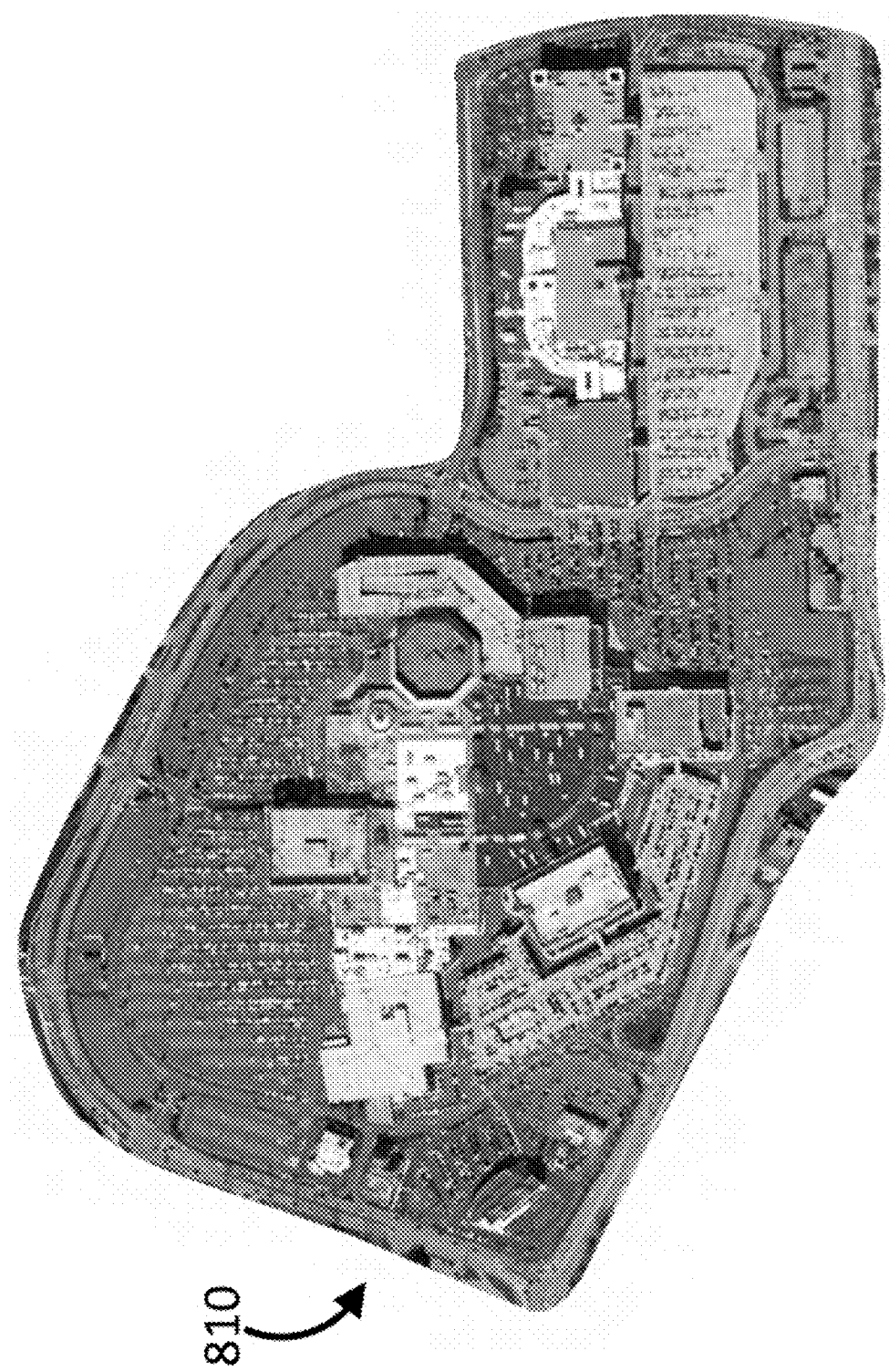
FIG. 8A is an example satellite image to be used as a source image by an artificial intelligence system for spatial semantic inference, in accordance with at least one embodiment.

FIG. 8A is an example satellite image 810 to be used as a source image by an artificial intelligence system of spatial semantic segmentation, in accordance with at least one embodiment.

Figure 8B:
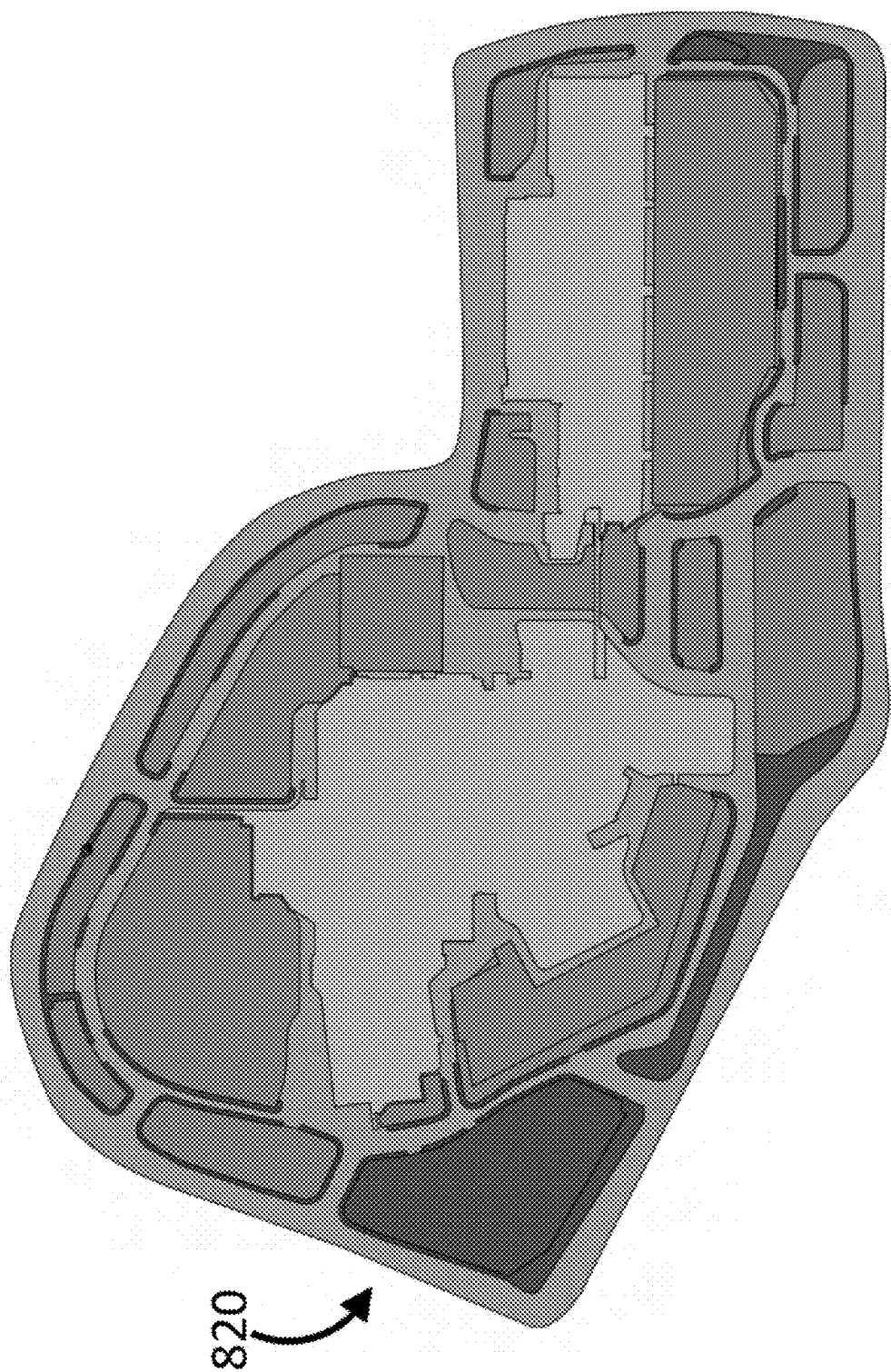
FIG. 8B is an example artistic rendering output of an artificial intelligence system for spatial semantic inference, in accordance with at least one embodiment.

FIG. 8B is an example artistic output image 820 of an artificial intelligence system of spatial semantic segmentation, in accordance with at least one embodiment. The example satellite image 810 of FIG. 8A has undergone the processes as defined in FIG. 4 and FIG. 7 to create the example artistic output image 820 of FIG. 8B.

While the above description provides examples of one or more apparatus, methods, or systems, it will be appreciated that other apparatus, methods, or systems may be within the scope of the claims as interpreted by one of skill in the art.

The invention claimed is:

1. A method of performing semantic inference on a source image of a location to automatically create a cartographic representation of the location, the method comprising:
   providing a vector image of a location;
   generating a raster image from the vector image, the raster image including at least one partition, the at least one partition including a plurality of pixels;
   assigning a pixel class label to each of the plurality of pixels by an artificial intelligence network, the pixel class label including a usage class; and
   assigning a partition class label to the at least one partition based on the pixel class labels assigned to the plurality of pixels, wherein the partition class label includes a usage class for the partition.

2. The method of claim 1 further comprising generating a labelled image of the location wherein the at least one partition includes a partition identifier based on the partition class label, and wherein the partition identifier is specific to the usage class associated with the partition class label.

3. The method of claim 1, wherein the providing the vector image includes generating the vector image from a non-vector source image.

4. The method of claim 1 further comprising detecting text content in the vector image and removing the text content from the vector image.

5. The method of claim 1, wherein the assigning a partition label to the at least one partition includes determining the most commonly assigned pixel class label and assigning the most commonly assigned pixel class label as the partition class label.

6. The method of claim 1, wherein the generating a raster image includes generating a raster image having a resolution that is lower than the resolution of the vector image, and wherein the resolution of the raster image is within an acceptable range for performing the assigning pixel class labels to the plurality of pixels.

7. The method of claim 1 further comprising:
   generating aligned data by validating the pixel class labels using the pixel class labels and the vector image; and
   training a neural network using the aligned data, wherein the neural network is configured to perform the assigning the pixel class labels.

8. The method of claim 1 further comprising generating the vector image from a raster source image, and wherein the raster source image has a resolution higher than the raster image.

9. The method of claim 1 further comprising identifying the at least one partition by tracing a polygon onto the vector image, wherein the polygon corresponds to the at least one partition and assigning the partition class label to the polygon.

10. The method of claim 1, wherein the raster image is a monochromatic line image.

11. A computer system for performing semantic inference on a source image of a location to automatically create a cartographic representation of the location, the system comprising:
    at least one processor; and
    a memory in communication with the at least one processor, the memory storing computer-executable instructions which when executed by the at least one processor cause the system to perform:
    generating a raster image from a vector image of a location, the raster image including at least one partition, the at least one partition including a plurality of pixels;
    assigning a pixel class label to each of the plurality of pixels by an artificial intelligence network, the pixel class label including a usage class; and
    assigning a partition class label to the at least one partition based on the pixel class labels assigned to the plurality of pixels, wherein the partition class label includes a usage class for the partition.

12. A method of performing semantic inference on a source image of a location to automatically create a cartographic representation of the location, the method comprising:
    providing a raster image of a location;
    assigning the raster image at least one partition, the at least one partition including a plurality of pixels;
    assigning a pixel class label to each of the plurality of pixels by an artificial intelligence network, the pixel class label including a usage class; and
    assigning a partition class label to the at least one partition based on the pixel class labels assigned to the plurality of pixels, wherein the partition class label includes a usage class for the partition.

13. The method of claim 12 further comprising generating a fixed-resolution raster image from the raster image wherein the fixed-resolution raster image has a lower resolution than a resolution of the raster image.

14. The method of claim 13 wherein the generating a fixed-resolution raster image from the raster image includes:
    generating a vector image from the raster image; and
    generating a fixed-resolution raster image from the vector image.

15. The method of claim 14 further comprising identifying the at least one partition by tracing a polygon onto the vector image, wherein the polygon corresponds to the at least one partition, and assigning the partition class label to the polygon.

16. The method of claim 14 further comprising identifying the at least one partition by tracing a polygon onto the vector image, wherein the polygon corresponds to the at least one partition and assigning the partition class label to the polygon.

17. The method of claim 12 further comprising generating a labelled image of the location wherein the at least one partition includes a partition identifier based on the partition class label, and wherein the partition identifier is specific to the usage class associated with the partition class label.

18. The method of claim 12 further comprising detecting text content in the raster image and removing the text content from the raster image.

19. The method of claim 12, wherein the assigning a partition label to the at least one partition includes determining the most commonly assigned pixel class label and assigning the most commonly assigned pixel class label as the partition class label.

20. The method of claim 12 further comprising:
generating aligned data by validating the pixel class labels using the pixel class labels and the raster image; and
training a neural network using the aligned data, wherein the neural network is configured to perform assigning the pixel class labels.

\* \* \* \* \*